(12) United States Patent
Bauer et al.

(10) Patent No.: US 11,059,076 B2
(45) Date of Patent: Jul. 13, 2021

(54) SORTING SUPPORT METHODS, SORTING SYSTEMS, AND FLATBED MACHINE TOOLS

(71) Applicant: TRUMPF Werkzeugmaschinen GmbH + Co. KG, Ditzingen (DE)

(72) Inventors: Klaus Bauer, Ditzingen (DE); Eberhard Wahl, Weilheim an der Teck (DE); Jonathan Walter, Schwieberdingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 159 days.

(21) Appl. No.: 16/387,811

(22) Filed: Apr. 18, 2019

(65) Prior Publication Data

US 2019/0243344 A1 Aug. 8, 2019

Related U.S. Application Data

(63) Continuation of application No. PCT/EP2017/076868, filed on Oct. 20, 2017.

(30) Foreign Application Priority Data

Oct. 21, 2016 (DE) .......................... 102016120132.4
Apr. 5, 2017 (DE) .......................... 102017107357.4

(51) Int. Cl.
*G06F 7/00* (2006.01)
*B07C 7/00* (2006.01)
(Continued)

(52) U.S. Cl.
CPC ................ *B07C 7/005* (2013.01); *B23Q 7/12* (2013.01); *B25J 9/1697* (2013.01); *B26D 5/007* (2013.01);
(Continued)

(58) Field of Classification Search
CPC .......... B07C 7/005; B23Q 7/12; B26D 5/007; G05B 19/401; G05B 19/40935;
(Continued)

(56) References Cited

U.S. PATENT DOCUMENTS 8,179,604 B1   5/2012  Prada et al.
8,279,091 B1  10/2012  Tran et al.
(Continued)

FOREIGN PATENT DOCUMENTS

DE       10215885    10/2003
DE      102008014869   9/2009
(Continued)

OTHER PUBLICATIONS

CN Office Action in Chinese Appln. No. 201780065038.9, dated Aug. 7, 2020, 19 pages (with English translation).
(Continued)

*Primary Examiner* — Yolanda R Cumbess
(74) *Attorney, Agent, or Firm* — Fish & Richardson P.C.

(57) ABSTRACT

A method for assisting a user with sorting workpieces disposed on a sorting table uses a positioning system for determining a spatial position of a user's hand. The position can be determined by a sorting assistance unit worn near a hand of the user and the position of which is detected by the positioning system, or by image-based positioning using one or more cameras. The method comprises providing a position data set that includes the positions of the workpieces produced of the machining plan on the sorting table; by the positioning system, detecting a position of the user's hand and comparing it with the positions of the position data set; identifying at least one workpiece that is paired with the position of the user's hand; and outputting a sorting signal which comprises information about the at least one workpiece paired with the position of the user's hand.

33 Claims, 4 Drawing Sheets

(51) Int. Cl.
*B25J 9/16* (2006.01)
*G05B 19/418* (2006.01)
*B23Q 7/12* (2006.01)
*B26D 5/00* (2006.01)
*G05B 19/401* (2006.01)
*G05B 19/4093* (2006.01)
*G06K 9/00* (2006.01)

(52) U.S. Cl.
CPC ..... *G05B 19/401* (2013.01); *G05B 19/40935* (2013.01); *G05B 19/4183* (2013.01); *G06K 9/00355* (2013.01); *G05B 2219/31304* (2013.01); *G05B 2219/31372* (2013.01); *G05B 2219/32014* (2013.01); *G05B 2219/32037* (2013.01); *G05B 2219/36167* (2013.01); *G05B 2219/45047* (2013.01); *Y02P 90/02* (2015.11)

(58) Field of Classification Search
CPC ...... G05B 19/4183; G05B 2219/32037; G05B 2219/31372; G05B 2219/31304; G05B 2219/32014; G05B 2219/36167; G05B 2219/45047; G06K 9/00355; B25J 9/1697; Y02P 90/02
USPC .................. 700/213–215, 218–219, 223–224
See application file for complete search history.

(56) References Cited

U.S. PATENT DOCUMENTS

| | | | |
|---|---|---|---|
| 8,947,456 B2* | 2/2015 | Chen | G09G 5/00 345/633 |
| 9,126,423 B2* | 9/2015 | Costin, Sr. | B41J 3/42 |
| 2006/0104479 A1* | 5/2006 | Bonch-Osmolovskiy | G06K 9/00355 382/103 |
| 2010/0121480 A1 | 5/2010 | Stelzer et al. | |
| 2010/0272961 A1* | 10/2010 | Costin, Jr. | G05B 13/00 428/156 |
| 2014/0083058 A1 | 3/2014 | Issing et al. | |
| 2015/0146008 A1 | 5/2015 | Conner et al. | |
| 2016/0161301 A1 | 6/2016 | Guenther et al. | |

FOREIGN PATENT DOCUMENTS

| | | |
|---|---|---|
| DE | 102010017857 | 10/2011 |
| DE | 102011002952 | 7/2012 |
| DE | 102011054360 | 4/2013 |
| DE | 102014204695 | 9/2015 |
| DE | 102014211353 | 12/2015 |
| DE | 102015111506 | 4/2016 |
| DE | 202016101576 | 5/2016 |
| EP | 1487616 | 12/2004 |
| EP | 1524063 | 4/2005 |
| EP | 1630716 | 3/2006 |
| EP | 2161219 | 3/2010 |
| WO | WO 2012/123033 | 9/2012 |
| WO | WO 2014/028959 | 2/2014 |

OTHER PUBLICATIONS

The International Search Report and Written Opinion for International Application No. PCT/EP2017/076868 dated Mar. 8, 2018.

The German Office Action for German Application No. DE 10 2017 107 357.4 dated Sep. 22, 2017.

Reif et al., "Pick-by-Vision comes on Age: evaluation of an augmented reality supported picking system in a real storage environment", *Proceedings of the 6th International Conference on Computer Graphics, Virtual Reality, Visualisation and Interaction in Africa, Afrigraph 2009*, Pretoria, South Africa, Feb. 4-6, 2009.

* cited by examiner

SORTING SUPPORT METHODS, SORTING SYSTEMS, AND FLATBED MACHINE TOOLS

CROSS REFERENCE TO RELATED APPLICATIONS

This application is a continuation of and claims priority under 35 U.S.C. § 120 from PCT Application No. PCT/EP2017/076868, filed on Oct. 20, 2017, which claims priority from German Application No. 10 2016 120 132.4, filed on Oct. 21, 2016, and German Application No. 10 2017 107 357.4, filed on Apr. 5, 2017. The entire contents of each of these priority applications are incorporated herein by reference.

TECHNICAL FIELD

The present invention relates to methods for supporting the sorting process of workpieces produced with a flatbed machine tool, for integrating the sorting process into the control of flatbed machine tools, flatbed machine tools and sorting systems.

BACKGROUND

When sorting parts at machine tools, in particular laser cut material or punched workpieces, in particular sheet metal parts, an operator usually visually compares each individual cut part with a drawing of an order of the respective part. Such a mostly paper-based sorting requires an individual search for a special finished part and its assignment to the correct order, so that a corresponding further processing can be initiated. After the processing process, cut or stamped sheet metal parts are often made available to the respective downstream production step in a group. If, in particular, many different part forms are cut, the visual comparison becomes time-consuming and prone to errors. For example, a large variety of parts can cause problems during part recognition and subsequent sorting to, for example, order-specific workpiece collecting point units. If parts are placed incorrectly, a subsequent process can be adversely affected.

EP 1 524 063 A1 discloses a process for marking workpieces in which a sheet is cut or punched. Thereby, a projector projects different optical markings onto the cut or punched workpieces being on the sorting table. This procedure is intended to simplify the sorting of the workpieces for the operator by displaying the workpieces and by providing a process control procedure for the further processing or further use of such cut or punched workpieces. In the case of workpieces that are very small, as it is often the case in sheet metal processing, the markings may become difficult to recognize, so that operators also fall back to paper-based sorting.

In the field of logistics, various procedures support workers. For example, WO 2014/028959 A1 discloses a camera-assisted procedure to assist a worker at installations for manipulating goods, EP 1 487 616 B1 discloses a procedure for automatic process control with detecting a work environment, and EP 2 161 219 B1 and DE 10 2014 211353 A1 disclose procedures for visual supporting manual picking operations. Pick-by-Light implementations are also known as examples of a digitally supported picking process.

A method for automatic process control is disclosed in DE 102 15 885 A1. Intelligent gloves for industrial use are also disclosed, particularly for supporting work processes in industrial manufacturing, for example, in DE 10 2015 111 506 A1 and DE 10 2011 002 952 A1.

SUMMARY

One aspect of this disclosure is based on facilitating the association of workpieces, reducing errors when associating, and/or enabling subsequent processes to be carried out efficiently.

In one aspect, the disclosure provides methods for supporting an operator at a sorting operation of workpieces that are arranged on a sorting table and which have been produced of a processing plan using a flatbed machine tool, e.g., a laser cutting or punching flatbed machine tool, with the use of a localizing system for determining a position of a hand of an operator in space. The methods include the following steps: providing a position data set that includes the positions of the workpieces on the sorting table produced of the processing plan; detecting a position of the hand of the operator, in particular of the sorting support unit, with the localizing system; comparing the position of the hand of the operator, in particular of the sorting support unit, with the positions of the position data set; identifying at least one workpiece that is associated with the position of the hand of the operator, in particular of the sorting support unit; and outputting a sorting signal that includes information about the at least one workpiece that is associated to the position of the hand of the operator, in particular of the sorting support unit.

For example, the position of the hand is determined with at least one sorting support unit located in its position or by image detection of the operator or his hand. For example, the operator can carry a sorting support unit close to the hand. The localizing system can determine the position of the sorting support unit in space by an active and/or passive transmitter provided in the sorting support unit. Alternatively or additionally, the localizing system can include, for example, one or more cameras and determine the position of the hand in space by image detection and image processing. This allows the localizing of the position of the hand to be determined independently of a carried sorting support unit.

In another aspect, a flatbed machine tool, e.g., a laser cutting or punching flatbed machine tool, includes a processing unit, e.g., a laser cutting processing unit or a punching processing unit, a control unit, in which a processing plan is stored, for controlling the processing unit to generate workpieces that are arranged next to one another spatially in accordance with a processing image data set, a sorting table for providing the arranged workpieces for sorting after manufacture, and a localizing system and at least one sorting support unit carried near the hand of the operator, whereby the position of the hand of the operator, e.g., of the sorting support unit, can be determined with the localizing system, wherein the control unit is adapted to perform the above described method.

In a further aspect, a sorting system includes a flatbed machine tool described above and in the following as well as a higher-level sorting control unit that is connected to the flatbed machine tool by data technology.

In some embodiments, the method for supporting a sorting operation can include one or more of the following steps: the workpiece closest to the hand of the operator, e.g., to the sorting support unit, can be identified as the at least one workpiece associated with the position of the hand of the operator, e.g., of the sorting support unit, or a plurality of workpieces closest to the hand of the operator, e.g., to the sorting support unit, can be identified as workpieces associated with the position of the hand of the operator. The workpiece closest in a direction of movement of the hand of the operator can be identified as the at least one workpiece associated with the position of the hand of the operator, e.g., of the sorting support unit.

Based on the sorting signal, location context sensitive information can be provided that includes as workpiece specific information, for example, customer data, information on a subsequent process step, a number of further identical parts, an assigned workpiece collecting point or an order number for the at least one workpiece associated with the position of the hand of the operator.

Location context sensitive information can be projected onto the at least one workpiece associated with the position of the hand of the operator. Optionally, a workpiece to be preferentially sorted can be optically marked or the information about the at least one workpiece associated with the position of the hand of the operator, such as the location context sensitive information, can be optically superimposed on the workpiece(s) as a text. In addition or alternatively, this can be displayed on a sorting support specific display unit, such as a workpiece collecting point specific display unit, data glasses of the operator, or a monitoring monitor, and/or can be output as a flashing signal.

A removal operation can be detected. It can be detected by determining a movement trajectory of the hand of the operator, e.g., of the sorting support unit, by evaluating the position data of the hand of the operator, e.g., of the sorting support unit, and detecting a removal movement in a section of the movement trajectory and/or by detecting a gesture movement with the movement trajectory of the hand of the operator, e.g., of the sorting support unit. Accordingly, for a removed workpiece, one can output a placing signal for system-supported placing of the removed workpiece at a workpiece collecting point unit that is provided for the removed workpiece.

A placing operation of the removed workpiece performed by an operator can be detected. It can be detected by determining a movement trajectory of the hand of the operator, e.g., of the sorting support unit, after the removal of the workpiece by evaluating the position data of the hand of the operator, e.g., of the sorting support unit, and detecting a placing movement in a section of the movement trajectory and/or by detecting a gesture movement by the movement trajectory of the hand of the operator, e.g., of the sorting support unit.

Furthermore, an association of gestures and processes can be provided and a motion trajectory of the hand of the operator, e.g., of the sorting support unit, can be determined by evaluating the position data of the hand of the operator, e.g., of the sorting support unit. Accordingly, a gesture in a section of the motion trajectory can be determined, and a process assigned to the gesture, such as booking or registering a removal operation or booking or registering a placing operation, can be determined.

In some embodiments, the method for supporting a sorting process can involve one or more of the following steps: outputting of a placing signal as a function of the sorting signal for supporting the assignment of the removed workpiece by an operator to a subsequent processing step, in particular for placing the removed workpiece at a workpiece collecting point unit; monitoring a placing operation of the removed workpiece carried out by an operator, wherein monitoring of a placing operation includes, for example, weight monitoring of a specific workpiece collecting point and/or monitoring of a movement trajectory or part of a movement trajectory of the removed workpiece or of an object causing the movement; outputting a sorting operation completion signal when the placing operation corresponds to a placing operation associated with the sorting signal, and optionally updating a display specific to a workpiece collecting point with respect to the placing of the removed workpiece; outputting an error signal when the placing operation differs from a placing operation associated with the sorting signal, and optionally displaying information relating to the placing operation assigned to the sorting signal; monitoring a placing operation of an operator of at least one removed workpiece in a reject collecting point, and assigning the at least one removed workpiece as a rejected piece and optionally entering the rejected piece in a missing parts list; outputting a supplementary production signal to a production control system; and comparing the production parameters of the removed workpiece to a subsequent processing plan, and if the production parameters correspond to the subsequent processing plan and there is availability of the removed workpiece, supplementing the subsequent processing plan with a production step to generate a replacement workpiece for the rejected workpiece.

The individual method steps can be processed so quickly with a processing time, partially in parallel, that the generated sorting signal is generated in less than 0.5 s, e.g., in less than 0.2 s, or in less than 0.1 s after the position detection of the hand of the operator. In general, the sorting signal can include sub-signals, each of which is assigned to an identified or removed workpiece if, for example, several workpieces are identified or removed. In addition, signals generally can be output as information on an operator's data glasses and/or a control system's monitoring monitor and/or as flashing signals.

Furthermore, the flatbed machine tool can optionally include a movable workpiece collecting point unit, and/or a reject collecting point. In addition or alternatively, it can include a system for monitoring a placing operation, e.g., for monitoring the weight of a specific workpiece collecting point unit, and/or a detection unit for optically detecting image signals in the visible and/or infrared wavelength range and/or for sound wave-based detecting of ultrasonic image signals with respective sensors with respect to the sorting table.

The sorting support unit can have an active transmitter and/or a passive transmitter whose position is detected by the localizing system. Furthermore, a sorting support unit specific display unit can be assigned to the sorting support unit, on which the information about at least one workpiece associated with the position of the sorting support unit is displayed.

The workpiece collecting point unit can also include a placing area for workpieces generated by the machine tool within a processing plan and a display unit adapted to receive information from the control unit of the machine tool about the placed workpieces and to output it to an operator. The display unit can also receive and output information about the number of stored workpieces, a subsequent processing step, and an underlying order. For example, the display unit is a real display unit, for example, an E-Ink display, which is mounted at the placing area, and/or a display unit as part of a control display that is, e.g., digitally emulated, for example, as part of a user interface displayed on a tablet.

The concepts disclosed herein and their application in the devices described herein are suitable for various materials and/or surface properties of workpieces and can provide advantages in sorting the same. Those workpieces include, for example, workpieces made of sheet metal, glass, semiconductor substrate-structures, printed circuit board-structures, or plastic parts, whereby the materials themselves, and in particular their surface properties, can transmit or at least partially reflect light. With such workpieces the recognizability of projected markings can often be inadequate even for larger workpieces, and operators can therefore fall back on paper-based sorting. In contrast, the concepts disclosed herein can increase the efficiency of sorting, especially for such workpieces.

Furthermore, it was shown that the concepts disclosed herein and their application in the devices described herein can have the additional benefit for the operator that he is not bound to a predetermined control procedure of which he has to sort the parts. For example, experiments with different operators when sorting with and without the use of the concepts disclosed herein have surprisingly shown that sorting is usually faster and more efficient if an operator can follow his own plan regarding the order of sorting and is not tied to an external specification. This can be due, among other things, to the specific circumstances when sorting workpieces produced with flatbed machine tools.

Workpieces produced in this way arrive at the sorting table together with the cut waste, which, for example, is shaped in the form of a residual grid. Due to the separation process, the workpieces can often still be connected to the cut waste (the residual grid) by tiny residual joints (so-called microjoints). When sorting, the operator first separates the workpieces from the rest grid and then sorts them to workpiece-specific trays. If individual workpieces are no longer firmly positioned on the sorting table, or are still connected to the rest grid and thus already hang tiltedly in the rest grid, it can be advantageous for the operator to sort them out first. This procedure applies in particular to bending resistant workpieces, so that the concepts disclosed herein and their application in the devices described herein can also be particularly suitable for the sorting of bending resistant workpieces. A bending resistant workpiece can be made of sheet metal, glass, or plastic, for example. Furthermore, parts cut (or stamped) from a semiconductor substrate or printed circuit board are often resistant to bending.

In general, a flatbed machine tool can be a laser cutting or punching flatbed machine tool that cuts only by laser or cuts only by punching. Furthermore, a flatbed machine tool can be a combination machine which implements both separation processes. Further processing steps such as deburring, bending, folding, welding, drilling, threading, etc., can also be carried out on the flatbed machine tool.

Furthermore, the concepts disclosed herein and their application in the devices described herein are adapted to provide supportive information in real time if possible. Timely provision is important, because the sorting process, the chronological sequence of which is determined by the flow and speed of the manual procedures of the operator, should not be slowed down (e.g., by waiting for a sorting signal). At least feedback should be given promptly about activities that were performed (e.g., the correct or incorrect associating to a collecting point). Thus, for example, a correct execution of the bookings of the various sorting operations in real time is important for the implementation of the concepts disclosed herein within an intelligent factory. Only for prompt detection, the system can create reasonable suggestions and make them accessible to the operator. For this purpose, the proposed sorting support automatically carries out the important steps such position comparison, and entering in the production control system (manufacturing execution system: MES), for example, in the background. The production control system is part of a multi-layered management system for monitoring and conducting an at least partly automated production. It is, for example, linked into the execution, management and control of the production of individual production steps, in real time. In general, the components and system structures are configured in such a way that the individual method steps are processed with a short processing time, especially partially in parallel. The sorting signal is generated during the movement, for example, in less than 0.5 s, in less than 0.2 s, or in less than 0.1 s after the detection of the hand of the operator.

In some embodiments, when picking up a, e.g., cut part, it is displayed to an operator in which crate (as an example for one type of a workpiece collecting point unit) the part is to be placed. The display can be optical. However, it is also conceivable, for example, to have an acoustic display or acoustic support for an optical display. Thereby, a specific association of a part can be automatically entered in the higher-level system as soon as the placing is performed. If parts are missing, e.g., due to rejects or machine malfunctions, extra production can be initiated directly via an interface to the MES. In some embodiments, the machine tool system includes a projector and/or one or more cameras. These can, for example, project or detect image information onto or from the sorting table of a flatbed or punch laser cutting machine. They can be, for example, permanently installed on the machine housing. After calibrating the projector/camera onto the sheet metal surface/sorting table, additional information can be output or detected with the same. For example, the position of the hand can be calculated from the images of one or more cameras.

A projector integrated in the method for supporting a sorting process makes it possible to output position-specific add-on information on a sub-area of the sorting table. For example, add-on information is projected onto the workpieces in the area of the hand of the sorting operator, the information simplifying for the operator the identifying and picking up of a workpiece that is preferred or is of particular interest at this point in time.

A camera integrated into the method for supporting a sorting process thus can further make it possible, for example by image processing, to identify a part gripped by the operator, e.g., on the basis of its shape and/or position on the sorting table. The image processing algorithm can access the order information and, thus, simplifying identification of the parts. Furthermore, a QR code or a material number, for example, can be engraved with a laser or marking laser during processing. With the help of the camera, this coding can be read and then used for identification and supporting the sorting.

As an alternative or as a supplement, an operator can use data glasses that can provide supplementary image information for part recognition and which, in addition to the image of the environment actually perceived, display further information, such as the QR code or a material number, within the field of vision.

By comparing the information obtained from the position evaluation with the order information, a higher-level sorting control unit of the sorting system can support workpiece recognition and, for example, identify the intended placing. For example, the tray is marked visibly to the operator on a monitor or data glasses, and the operator receives feedback as to whether the part has been placed correctly.

With comparing the detected removed workpieces with cutting instructions of the processing plan (e.g., of a cutting program), it can be recognized that a produced workpiece has been removed from the working area. Via an interface to the MES, one can also determine to which station of the processing this workpiece is to be transported next. An optical signal at the workpiece collecting point units, also referred to as load carriers, such as pallets, e.g., Euro-pallets or transport crates, can be controlled in such a way that it is indicated into which one the part must be placed. Optical signals include specific displays, an activation of specific LEDs, or a projection of information onto the load carrier.

A movement monitoring of the hand placing the load carrier can further detect and check the correct placing. By feedback to the MES, for example, a supplementary post-production can be automatically initiated at the next possible point in time for rejected parts that have been placed at a reject collecting point.

In general, the concepts disclosed herein can enable an increase in process reliability, an optimization of throughput times and, accordingly, a cost optimization of the production. The concepts disclosed herein can lead to a to some extent considerable time saving in the process from the production of the required number of parts to the placing being correct for a subsequent process, avoid errors in the associating, and enable intuitive workflows by, for example, automatic booking of workpieces. Several orders can be reliably processed in one sheet (e.g., in a sheet metal to be cut) and a cross-order spanning separation of the cut parts for the respective subsequent processes becomes possible. A sorting supported by the herein disclosed methods of multiple orders implemented on one sheet enables an automatic (cyclic) new common nesting of all open orders.

Thus, a flexible processing of the part removal and a paperless process flow (with the accompanying time saving in the work preparation), an integration of laser cutting machines or punching machines into the semi-automated manufacturing process can be made more efficient. In addition, error prevention and automatic, correct booking can lay the foundation for data-based real-time control of sheet metal production. Accordingly, machines that are used for the production of small batch sizes can also be integrated into a sheet metal production controlled by the MES within the framework of industry 4.0.

Furthermore, the use of mobile handheld devices such as scanners or tablets, which restrict the operator, can be omitted when using the methods and systems described herein.

Using the herein disclosed concepts, the production process of an intelligent factory and its indirect processes can be made more efficient. This includes the above explained advantages by outputting signals to an operator during the sorting process, such as displaying the workpiece collecting point unit assigned to a workpiece or the providing of information about erroneously sorted workpieces and subsequent processing steps. However, the concepts can also be linked with processes such as the transport to a subsequent processing step, whereby the processes can utilize the real-time information on the status of an order and, for example, on the number of workpieces already associated. Together with further localizing devices, it is also possible to communicate the current position of a workpiece collecting point unit to, e.g., the MES and display the same at a control station or to communicate the current position on site, e.g., by flashing or acoustic signals.

The advantages of the concepts disclosed herein include making important information accessible (especially directly on site at the operator's), contributing to the realization of paperless manufacturing and a considerable reduction in time and thus higher availability and productivity of machine tools. Furthermore, the concepts are easy to implement, as gloves are already worn by the operator for work safety and can easily be equipped with appropriate sorting support units. Furthermore, the concepts disclosed herein allow the information chain to be maintained by the automatic transfer of part information to the load carrier (workpiece collecting point unit) during sorting, e.g., transferred from the machine tool to the workpiece collecting point units. This increases transparency in manufacturing and makes it possible to locate parts in the plant quickly and easily. The data transfer of the part information generally increases process reliability. The delivery of the storage compartment and the corresponding information on the load carrier can also facilitate the programming of a subsequent machine, for example a subsequent processing process.

DETAILED DESCRIPTION

Figure 1:
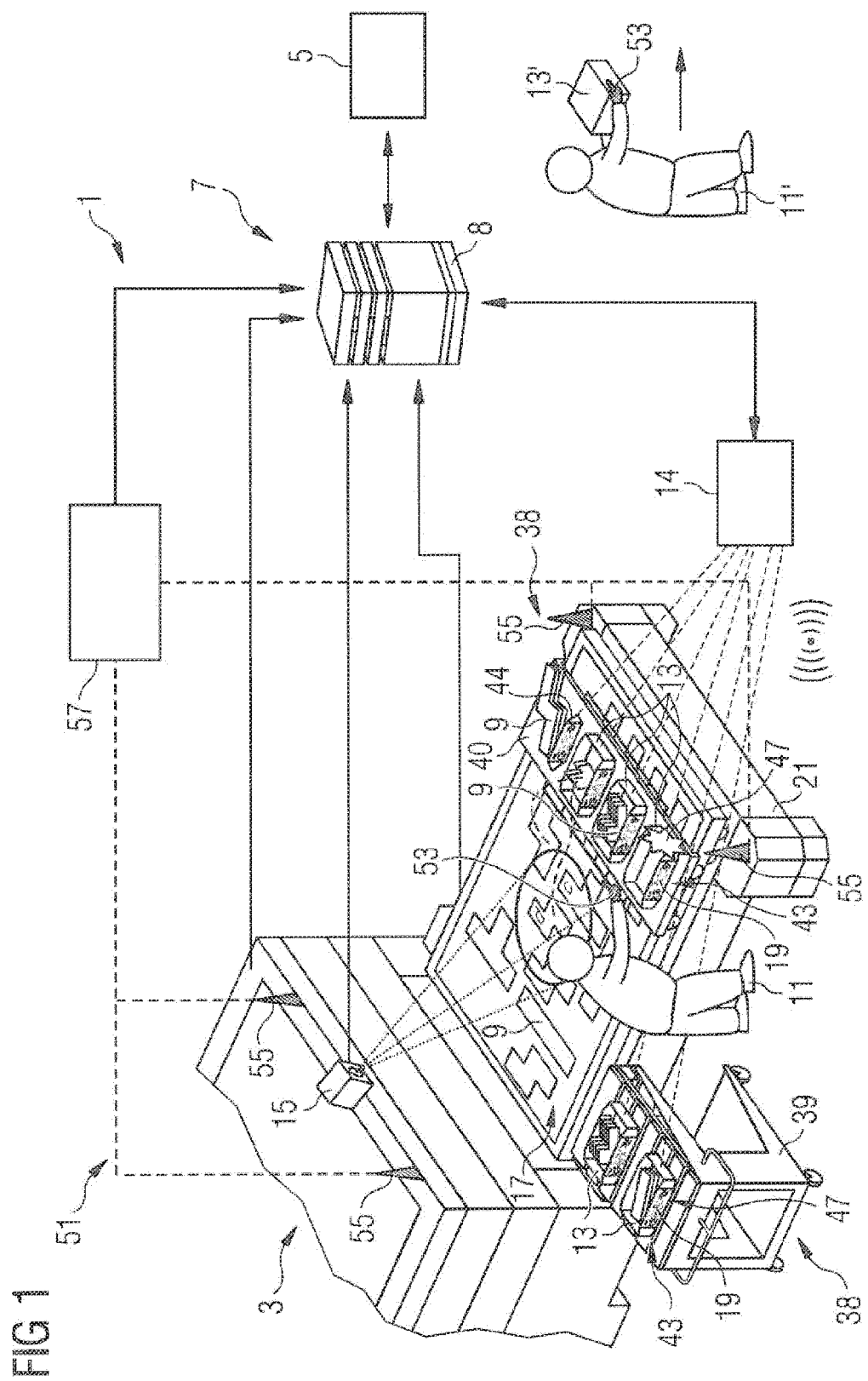
FIG. 1 shows an illustration of a portion of an intelligent factory with a laser cutting or punching flatbed machine tool.

The aspects described herein are partly based on the realization that for laser cutting (or punching) flatbed machine tools, a precise cutting plan (punching plan) is given that in combination with a detection of the position of the hand with respect to the sorting table on which the produced cut material is arranged can be used to support a manual sorting process and to obtain information suitable for further processing procedures. Thereby, it is proposed to detect the position of the hand with a sorting support device carried close to the hand, and the sorting support device includes sensors for position detection.

By extending flatbed systems with an indoor localization and interfaces to a control unit, the position of the workpiece collecting point units can be determined and/or the movement of the hand of the operator can be recorded. Such a localization can be done, e.g., via an ultra-wide-band-system of four or more so-called "anchors" and one or more "tags". The anchors serve as receivers and can be positioned stationary around the working area. The tags can be attached to the hand of the operator and optionally to all workpiece collecting point units; the tags can serve to detect their position. Other indoor localization systems include Bluetooth, Wi-Fi, infrared and RFID, for example.

This type of near-field localization can also be used, for example, in sorting when, e.g., the position of a hand (e.g., of an intelligent glove that interacts with the localizing system) is localized from the workpiece collection unit, for example. If the "hand" of an operator removes a component from the residual grid, the location of the component in the MES is booked from the residual grid to the hand. If the hand moves near a workpiece collecting point unit (e.g., near a localizing system of the workpiece collecting point unit), the MES books that this part has been placed at the associated workpiece collecting point unit. On the one hand, the localizing system can detect that the hand with the workpiece approached the workpiece collecting point unit. On the other hand, a higher-level system (e.g., the MES) can link the workpiece collecting point unit and the position of the hand.

The concepts described herein are accordingly based on a localizing system for position detection of a position sensor on an operator when sorting cut material. The implementation can, for example, be done with a data glove worn by the operator or another medium carried by the operator such as a ring, a wristband, a watch (Smartwatch), or a thimble (also commonly referred to as wearables).

In addition to permanently installed cameras, the image data can also be acquired with supplementary or alternative data glasses worn by the operator. For example, the data glasses can be used to track the hand in space by a camera integrated in the glasses using image processing.

Such position sensors have one or more transmitters and possibly sensors. Data gloves include such sensors at the wrist or finger, for example. The position sensors make it possible to integrate location context sensitive information on the environment into the sorting process and, for example, to selectively output associated information, e.g., on a display on the glove or generally in the visible area of the sorter.

Furthermore, the concepts described herein allow the system to be controlled by gestures. For example, the gripping process can be detected or accompanied by a specific movement of a gesture such as lowering the hand or pointing a finger. Alternatively or in addition to the gesture control, a connection to a foot switch or similar is possible. Voice control or a switch sensor on the finger/hand/arm is also conceivable.

Via the transmitter attached to the operator, the localizing system detects the position of the sorting process by the operator and can evaluate this position with the known positions of the parts. Accordingly, at least one workpiece associated with the position of the hand of the operator, e.g., of the sorting support unit, can be identified and information about the workpiece associated with the position of the hand of the operator, e.g., of the sorting support unit, can then be output via a correspondingly generated sorting signal. This makes it possible, for example, to assign the workpiece removed with the data glove and, based on the position of the transmitter in the localizing field, to display location context sensitive information on the environment. The assignment, possibly supplemented by motion detection, e.g., by gesture detection, allows a removed workpiece to be booked out at the removal point and assigned and booked to a placement point.

The concepts described herein relate to flat sheet metal installations that use punching or laser cutting to produce workpieces for subsequent processing steps from so-called sheets (starting sheets of predetermined thickness and predetermined size). A workpiece can be converted into a freely selectable shape, for flatbed machines a flat shape, by very flexible sheet metal processing using laser technology. Subsequent bending and welding processes then generate a product. With such laser cutting or punching flatbed machine tools, a processing plan (e.g., cutting plan) is stored as an input parameter in the machine control, wherein the processing plan contains the exact position of the produced workpieces with respect to the sorting table.

When providing a position data set that includes the position of the workpieces generated with the processing plan on the sorting table, in addition to the original (cutting) processing plan, one can also use additional information obtained during the processing procedure. The information includes, e.g., a coordinate transformation for adapting the (cutting) processing plan to the actual position of the raw sheet or displacements performed after the (cutting) processing. Such information is, for example, stored in the control unit linked to the (cutting) processing plan and, if necessary, is also communicated to the MES.

Shrinking batch sizes, i.e., the need to be able to produce small quantities in short time windows, and individualized products are current challenges for punching or laser cutting; these challenges have a particular impact on the automation of production processes in sheet metal manufacturing companies. The concepts described herein can coordinate and integrate IT-supported processes, especially for smaller batch sizes, assign these to individual machines, and play a role in an adaptable creation of the production plan.

There are high demands of a wide variety of products in so-called intelligent factories ("smart factories"). The e potential for more efficient design of manufacturing processes lies in indirect processes, e.g., the steps taking place before and after the separation process. For example, by enabling more efficient and error-free sorting and compensating for rejected workpieces, one can shorten the throughput time of an order across all manufacturing processes and one can achieve a more efficient utilization of the intelligent factory.

Transparent manufacturing planning, in which indirect processes are interlinked, provides an overview of production processes and allows their optimization. The operator becomes a process manager who controls the material flow with his oversight, especially for orders with small batch sizes.

FIG. 1 shows an overview of an intelligent factory 1 ("smart factory") that includes self-adapting production resources, such as a laser cutting or punching flatbed machine 3 shown as an example, and an associated MES 5. Usually, several such flatbed machine tool installations and post-processing stations form the intelligent factory 1. Via a network 7, the virtual and physical production elements and production steps, especially the information about workpieces 9 (required number, shape, material, type . . . ) come together in the MES 5. A control unit 8, such as a PC, computing node or similar suitable hardware, is used to control, the flatbed machine 3 and other components assigned to it. The control unit 8 is especially configured to support sorting the workpieces 9 by an operator 11 to workpiece collecting point units 13 during real-time operation of the intelligent factory 1. The underlying computing system includes, for example, digital processor systems with microprocessor circuits having data inputs and control outputs, the processor systems being operated according to computer-readable instructions stored on a computer-readable medium. Typically, the control unit 8 includes high computing power for real-time support and a long-term (non-volatile) memory for storing program instructions as well as a very fast short-term (volatile) memory for storing captured data and evaluation results of the memory for supporting the operator. The operator 11 sorts the workpieces 9 taken from a sheet 17 output by the flatbed machine 3 to the workpiece collecting point units 13. Using the sorting support unit described below, the removal decisions regarding the workpiece to be removed next and the subsequent placing operation at the respective workpiece collecting unit are thereby supported.

For example, while the operator is making the decision as to which of the workpieces to remove, information about the workpieces that are close to his hand and thus within his gripping range can be displayed. Furthermore, after removing the workpieces 9, a display 19 of an associated workpiece collecting point unit 13 can indicate, for example, that the workpiece 9 is to be stored in this unit. Display 19 can also show the status (general workpiece information), e.g., the number of placed workpieces 9, how many are still missing, or whether an error has been detected.

In this way, the operator 11, who as an "augmented operator" is provided with comprehensive information in as real a time as possible, can control the system and efficiently design and monitor manufacturing. As an expert and decision-maker, the operator 11 retains the final decision-maker function in all relevant processes of the production network. Thus, the operator can influence targets situationally and contextually, supported by IT-based assistance systems, such as the method for supporting a sorting process.

The flatbed machine 3 is a "social machine" that is in contact with other components with regard to production planning and is intelligently interlinked with the order control and the MES 5. Thus, for example, it can react to possible deviations in the cutting process independently and depending on the situation.

In traditional manufacturing, an operator would repeatedly pick up work papers relating to orders, manually start orders, sort parts, and associate these to work progress slips and setup plans. This means that the machine can often stand still for longer periods of time.

In contrast thereto, interlinked production in the intelligent factory 1 optimizes its indirect processes and provides an overview of the production processes to be carried out. The operator 11 becomes the process manager who keeps track and controls the material flow.

As exemplary sorting devices 38, FIG. 1 further shows a carriage 39 and a bridge 40 that is movable over the sorting table 21. On each of the sorting devices 38, there are one or more workpiece collecting point units 13. At each workpiece collecting point unit 13, there is a display unit 43 with the display 19 and a signal output device 47. Alternatively or in addition to the optical display, acoustic and haptic signals are possible. Furthermore, a combined signal/display unit 44 can be used that can, for example, be placed close to the placing location of larger workpieces.

In general, picking up and sorting parts, for example, cut parts, is time-consuming, error-prone, and a great challenge (with several orders produced from one blank). With the concepts proposed herein, manufacturing orders for small quantities per batch, for example, can be efficiently sorted for nested parts.

As will be explained in more detail below, one can use the automated localizing of the hand of the operator 11 to monitor which workpiece 9 was removed from a sheet 17 that was output by the flatbed machine 3. At one of the intelligent and interlinked workpiece collecting point units 13, a display 19 can then give a sign and show the operator 11 the sorting location which is assigned, for example, by the MES 5. Localizing the position of the hand can also enable the placing operation to be booked, e.g., registered or stored," in the MES 5. In addition, the workpiece collecting point units 13, e.g., that can be designed as intelligent crates, can output current order information received from the MES 5, e.g., an E-Ink display. The workpiece collecting point units 13 enable, e.g., a (possibly spatially rough) localization and can enable an intuitive "fine search" for the operator, for example, by flashing. For example, the workpiece collecting point units 13 are connected to their own data supply system 14 that is connected to the MES 5 and the control unit 8 for data exchange.

After a number of required workpieces have been sorted into a workpiece collecting point unit 13', an operator 11' (or automated robot system) takes the workpiece collecting point unit 13' to a subsequent processing step.

An electronic assistant supports the operator 11 on the information side by providing situational information. This allows the operator 11 to continue implementing individual preferences (such as where do I start, do I create small hand buffers or not . . . ) in the sorting process. Steps include monitoring, evaluating, and providing the information required for the situation.

To detect the required position of the removing hand, a localizing system 51 is provided in the area of the workstation that permits the localization of one hand of the operator, e.g., of a sorting support unit 53. The sorting support unit 53 is located close to the hand/arm of the operator 11. In FIG. 1, the sorting support unit 53 is attached to a glove of the operator 11. The sorting support unit 53, for example, is a transmitter (Radio Frequency Identification, RFID) whose actual position can be detected in real time. Bearing transponder systems operate, e.g., in the range of 2.45 GHz with a spatial resolution of a few centimeters.

As shown in FIG. 1, the localizing system 51 has, for example, four antennas 55, whereby at least three antennas (preferably more to increase accuracy) are provided close to the sorting table 21 and optionally at workpiece collecting units (for example, the mobile carriage 39). Radio waves detected via the antennas 55 are transmitted as data to a positioning calculation section 57 of the localizing system 51, the section determining the position of the sorting support unit 53 and optionally its movement trajectory from the different signal propagation times. The positioning calculation section 57 of the localizing system 51 can, for example, also be formed as part of the MES 5.

Using the data stored in the position data set for workpiece generation from the flatbed machine 3, the position of the parts to be removed is also known in the same coordinate system. If the position and preferred shape and size of the workpieces are known that need to be sorted to a specific workpiece collecting point unit 13 (e.g., in the form of a load carrier), which is located in the measuring range of the localizing system, then the placing operation of the sorting can also be supported. For example, for the carriage 39 or the bridge 40 can include individual placement areas (or compartments), and each compartment can be assigned to a display unit. Their geometry and/or position can be stored in the MES 5. The positions of the workpiece collecting point units 13 (e.g., the mobile carriages 39) are generally available in the system. The MES database, which can be configured as a cloud, also provides basic data on the manufactured workpieces and serves as a memory for storing the location and position information of the various system components.

One or more sensors of the sorting support unit 53 carried by the operator also allow the detection of gestures that trigger specific actions in the MES. The detection of specific gestures can also be supported alternatively or additionally by an environment camera.

The following applications are possible with the configuration described herein:

Information can be displayed about workpieces 9 in the environment of the operator's hand (therefore, paper-based sorting is not required).

The removal of a workpiece can be booked or stored or registered, based on an operator's hand gesture, such as when an operator's hand grips a workpiece 9. Furthermore, the workpiece can be added to a workpiece collecting point by hand, and then a gesture control is used to book when it is deposited.

The booking of the workpieces can further include, for example, the assignment to a load carrier and a notation, as to which and how many workpieces are placed, as well as where certain workpieces were moved to, e.g., the location at defined compartments.

In one embodiment, the sorting support unit 53 is configured as a work glove equipped with an attachable transmitter kit. In case of wear, the work glove can be replaced and the existing transmitter kit can be attached to the new work glove. The glove can be used to control a projector 15 in a location context sensitive manner, to display information e.g., about the workpiece 9, onto the sheet metal (workpieces 9) at the appropriate region the operator's hand. In FIG. 1, for example, a projector 15 is mounted above the sorting table 21, and is adapted to provide information in an area close to the motion of the operator's hand, e.g., by scanning text or highlighting areas/workpieces. Alternatively or additionally, the necessary information can be provided via a display unit on the glove 53.

The localizing system 51 knows from the position of the sorting support unit 53, e.g., a glove or another medium attached to the hand of the operator, above which workpiece 9 the hand is located, for position determination. In addition, a detected workpiece 9 can also be shown on the display unit 44 with further information on the workpiece. Such information includes, for example, customer data, information on the subsequent process step, display of the corresponding load carrier 13 and the number of other identical workpieces 9.

In some embodiments, the workpiece 9 is registered as removed by the gripping movement of the operator and automatically assigned to the load carrier/workpiece collecting point unit 13 (e.g., boxes, pallets, boxes with several compartments, etc.). The workpiece collecting units 13 also can be equipped with a transmitter. The workpiece collecting units 13, e.g., load carriers, can be equipped with a transmitter regardless of their characteristics. There is therefore no dependence on specific load carriers 13 for specific workpieces 9.

As a result, the location system/MES 5 knows on which workpiece collecting point unit 13, and in which compartment of a load carrier, each workpiece is, and in what quantity. Accordingly, the system can control the material flow and/or specific workpieces 9 can be located quickly and easily.

A projector is known that can display the information for the operator on the sheet metal from which the workpieces 9 are formed. This is practically difficult to implement, because the radiation behavior of sheet metal (mirrors) requires a high light power. Consequently, only laser projectors with scanners can be used appropriately. However, these cannot cover the entire sorting table at once. For this reason, the location context-sensitive projection approach disclosed herein offers a solution to this problem: the information is projected only onto the workpieces in the vicinity of the operator/of the operator's hand. This location context sensitive projection is easy to implement and economically feasible with currently available technical systems.

Figure 2:
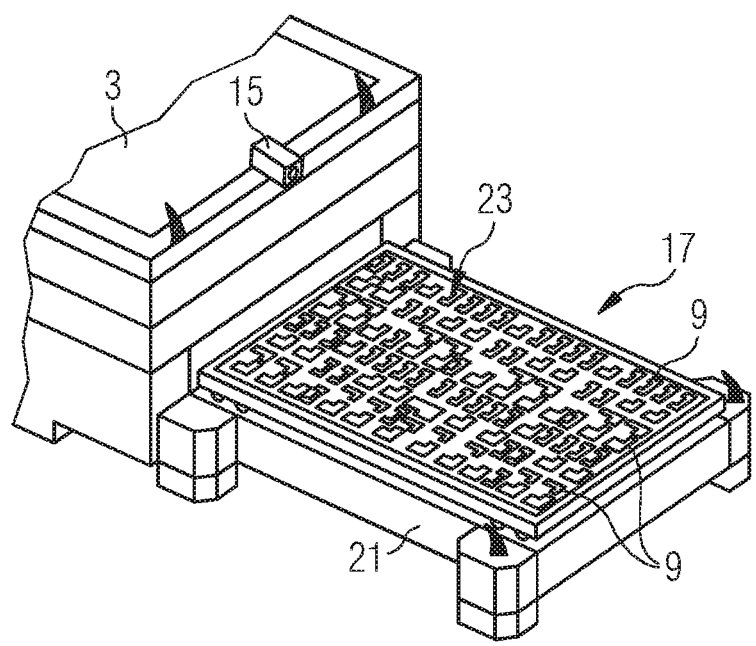
FIG. 2 shows an illustration of an exemplary arrangement of workpieces on a sorting table.

FIG. 2 shows an example of an arrangement of workpieces 9 of a machined sheet as it can be present on a sorting table 21 after production with a flatbed machine 3. To detect the removal of workpieces by the operator, the localizing system 51 detects the position of the sorting support unit 53 in the monitored working area 23 that extends over the processed and to be sorted sheet. The sorting is carried out by an operator 11, shown in the example of FIG. 1 as a human being, (not a robot). To determine the position of the sorting support unit 53 and thus the hand over the cut sheet metal on the pallet, the coordinates of the localizing system 51 are calibrated to the coordinates of the flatbed machine 3.

The control unit 8 with interface to the localizing system 51 and to the flatbed machine 3 recognizes which workpiece 9 is in the vicinity of the hand and is removed from the sorting table 21 by using suitable methods of position comparison (e.g., a difference formation with respect to the surface center of gravity of a workpiece). The positions of the workpieces 9 to be sorted are indicated by the underlying processing plan.

Figure 3:
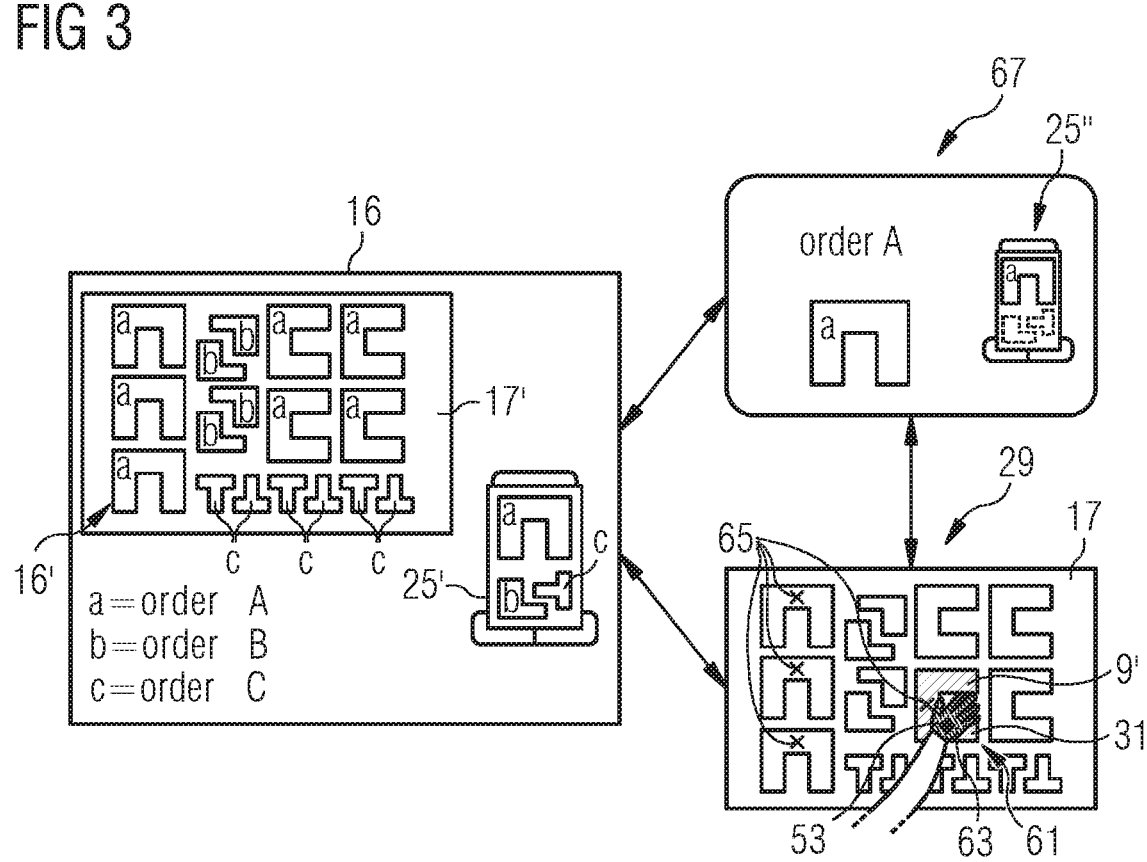
FIG. 3 shows illustrations of a position data set and the identification of a workpiece.

FIG. 3 shows schematically a processing plan 16 with an exemplary visualization of a position data set 16'. The processing plan 16 provides the basis for the arrangement of the workpieces 9 on the sorting table 21. Exemplarily planned parts are shaped in three types a, b, c and are arranged on a schematically reproduced sheet 17'. The parts are assigned to three orders A, B, C. It can also be seen that the parts once produced are to be sorted into three stacks of the types a, b, c on a carriage symbol 25' as workpiece collecting point units 13.

FIG. 3 also schematically shows a sorting operation 29 and an exemplary displaying of information for the operator on a display 67.

The schematically illustrated sorting operation 29 shows a hand 61 wearing a glove 63. The sorting support unit 53 having a transmitter is attached to the glove 63. The position of the sorting support unit 53 above the sheet 17 including the cut workpieces 9 is determined and compared with the center of gravity 65 of the workpieces 9. For example, a distance is determined by the geometric mean. FIG. 3 shows a workpiece 9' (cross-hatched) that represents the workpiece associated with the position of the sorting support unit 53, which in this case is closest to the hand 61 of the operator.

In FIG. 3, order information (here text "order A") for this workpiece 9' is shown on the display 67. For example, the shape of the workpiece 9' can also be displayed for visual inspection by the operator. It is also possible, for example, to display an associated workpiece collecting point unit 13 or information on the placing operation. As indicated in FIG. 3, for example, information on the exact placement point of the workpiece on an associated carriage can be displayed using a carriage symbol 25".

By constantly updating the display 67, the operator can be assisted in his selection of the next workpiece to be sorted and in the placing operation.

Figure 4:
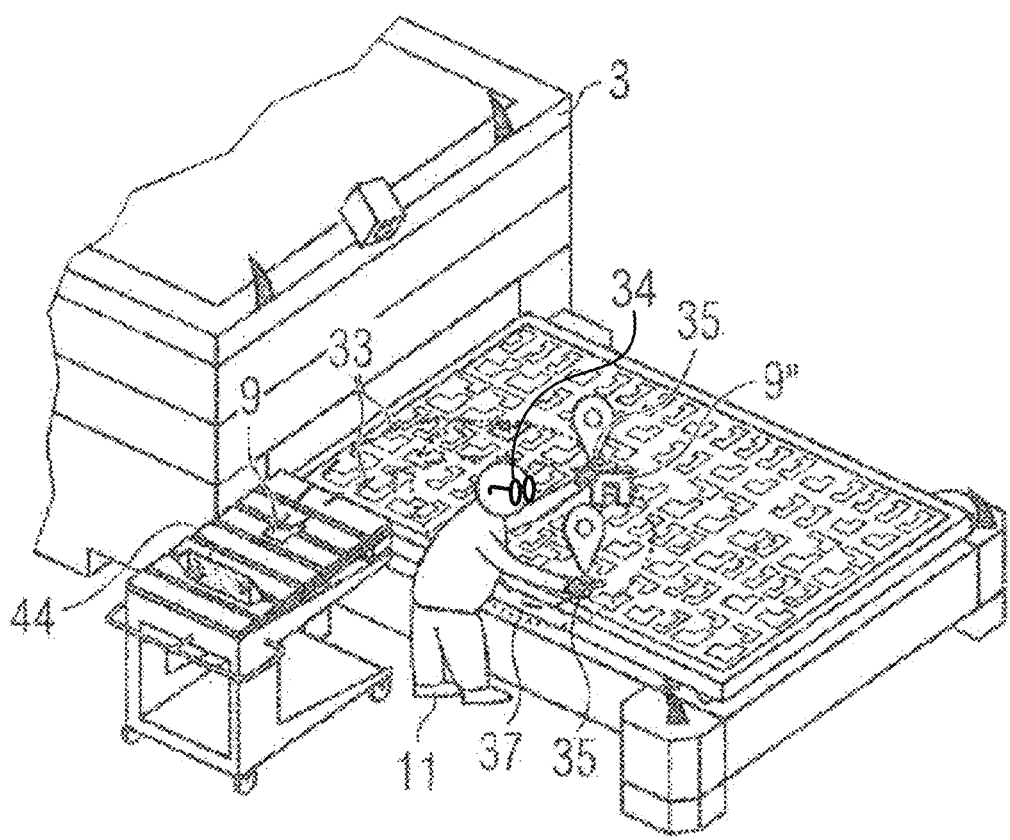
FIG. 4 shows an illustration of an exemplary monitoring of a placement procedure of a removed workpiece.

The display 67 can, for example, be in the vicinity of the pallet changer of the flatbed machine. Alternatively, information can be projected using projector 15 (e.g., laser projector). Furthermore, the display can be realized on data glasses 34 (e.g., as shown in FIG. 4 worn by operator 11). Such "augmented reality" glasses can be used to display not only the fixed and correct placement location, but also its target height. For example, Hololens® data glasses can be used to display 3D holographic objects fixed in location. The operator 11 can easily check whether a stack of workpieces is complete.

In FIG. 3, the double arrows represent the processing of the information from the processing image data set 16' and the position information of the sorting support unit 53 in the MES 5.

Once the removal process has been recorded, the MES 5 can also cause the display unit of the responsible workpiece collection unit 13 to output signals that simplify the placement process. The display unit 43 can be updated to inform the operator 11 about what is to happen next with the removed workpiece 9 (it is classically placed in a crate that is used as workpiece collecting point unit 13 for further transport). The control unit 8 has access to the MES 5 to determine not only the next placing location (in which crate the part must be placed), but also other information such as material, order number, customer, etc., which is stored therein.

The workpiece collecting point units 13 also have a communication interface to the control unit 8 and can output information on the order, e.g., via an E-Ink display. Via the interface, the workpiece collecting point units 13 are thus also in a position to indicate to the operator 11, who is picking up a workpiece 9, into which crate the workpiece 9 should be placed. A built-in scale or another suitable sensor unit can be used to determine whether the operator 11 has placed the workpiece 9 in the correct crate. Accordingly, feedback can be sent, e.g., via a counter on the E-Ink display. Thus, in control unit 8, a determination can be made as to whether all workpieces 9 have been sorted correctly or whether workpieces 9 of the order are missing that, for example, have fallen through the rest grid.

It is also conceivable that the operator 11 recognizes a faulty part during sorting and places it in a collecting point provided for rejects. In another case, the flatbed machine 3 automatically records faulty cuts, manual operator interventions or even collisions during sheet processing and records the affected parts as rejects via the interface to the control unit 8. This allows the operator to be notified before picking up the damaged workpiece that it should not be sorted or placed as a reject. For such cases, an order for the post-production of the identified rejects can automatically be created in the MES 5 and planned.

As shown in FIG. 4, the localizing system 51 also enables analysis of the movement of the hand, e.g., to recognize gestures or to evaluate movement trajectories in general. Thus, by tracking of the hand of the operator 11, the system 51 can determine whether the workpieces were placed in the correct crates. As an example, movement trajectories 33 of the hand when removing a workpiece 9 are shown in FIG. 4.

Furthermore, the tracking information can be used to improve the procedure for detecting a workpiece 9 that has been removed. By localizing the hand (e.g., positions 35), its motion trajectory or a part of the motion trajectory, a region of interest _37 is defined in the image area. The above mentioned projection of information can be limited to that area. The projection does not have to cover the entire workspace 23, but only the region of interest 37 around the hand of the operator 11. If several operators 11 work during the sorting process, a region of interest can be defined simultaneously for each operator 11 at the sorting table 21. Each operator 11 can thus be provided with individual information on the correct placing location of the workpiece.

In addition to the previously mentioned approach of executing the logic and computing power in a central computing node (control unit), other known topologies can be used for linking flatbed machine 3, localizing systems, projector 15, optionally an imaging system, workpiece collecting points 13 (e.g., crates), and MES 5.

The system 51 can also provide to the operator 11 an optimal sorting strategy via the projection screen, e.g., at the data glove or at the data glasses 34, by the available information even if he can still sort according to a self-chosen strategy. With many small parts, for example, the system 51 can suggest to the operator to remove several identical parts at the same time. Using an algorithm, it is possible to calculate and display in real time how many parts can be removed at a time, depending on the size and weight of the individual parts, for example. This can also be individually adjustable depending on the operator. Furthermore, if the operator 11 has picked up a shaped workpiece 9 of type a, the position of other workpieces 9 of the same type, for example along a favorable movement trajectory, can be displayed to the operator 11. This can be done with the projector 15, for example. This can, for example, avoid unnecessary paths.

After a removed workpiece 9 has been successfully read or scanned into the system 51, the control unit 8 outputs the correct placing location to the operator 11, e.g., via a projection screen at the data glove or at the data glasses 34. This correct placing location could be, for example, a numbered storage compartment. If the storage compartment is at a more distant location, the projection surface of the data glasses 34 can be used to refer via a map to the storage area. The data glasses can also include a supporting camera, which can be used to recognize the storage compartment as soon as it is within the visible area and mark it on the projection surface of the data glasses 34.

The control unit 8 also monitors by the localizing system 51 whether the part was placed in the correct compartment during the placing procedure and provides feedback to the operator 11.

Figure 5:
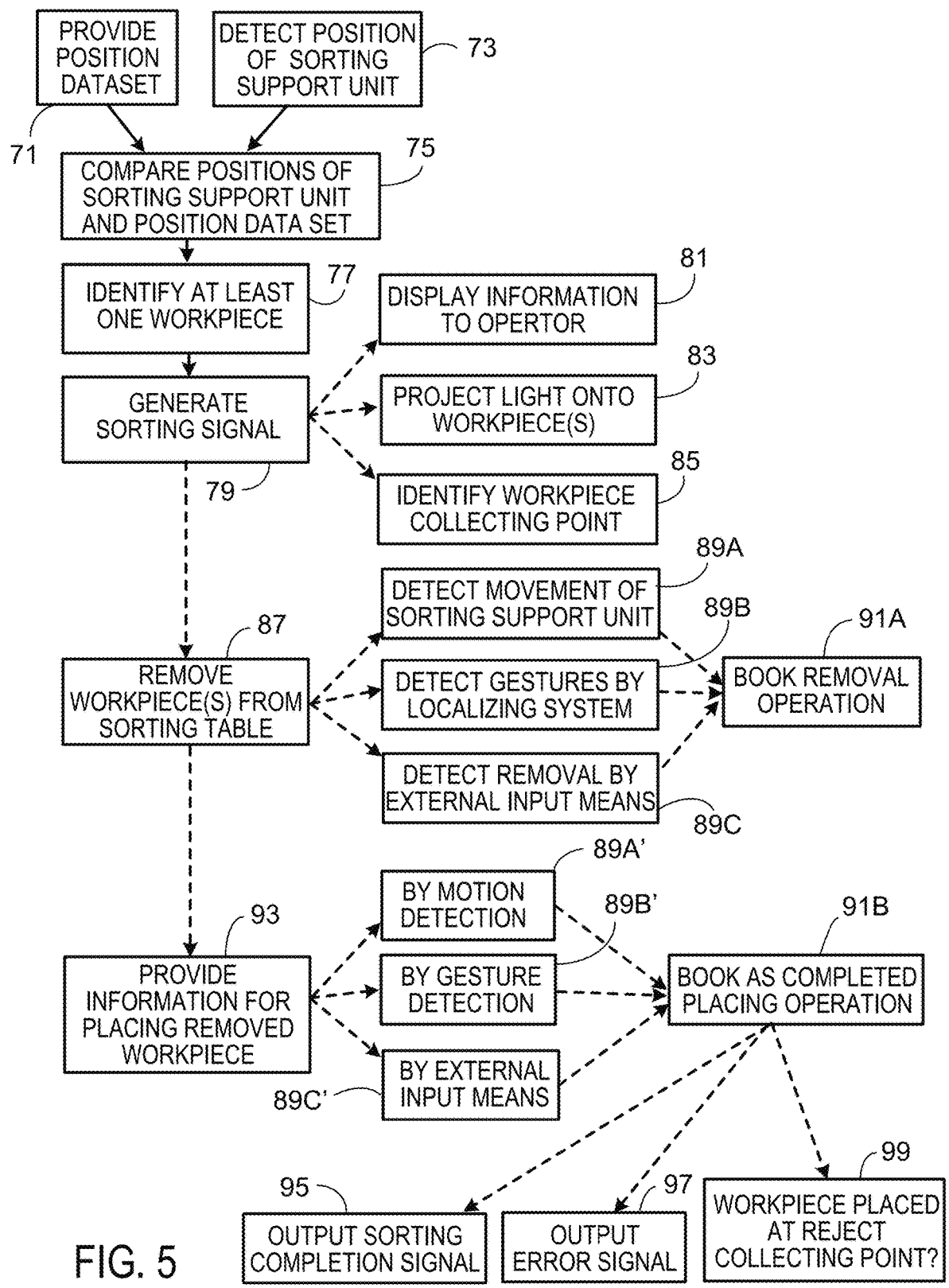
FIG. 5 shows a flow chart for illustration of an exemplary process flow during the support of a sorting process.

FIG. 5 shows a flow chart to illustrate an example of procedures in the support of a sorting process as described herein. It is assumed that workpieces, which are arranged on a sorting table, have been produced with a flatbed machine tool, e.g., a laser cutting or punching flatbed machine tool as described above, based on a processing plan.

In the control unit 8, a position data set of the processing plan (see, e.g., the position data set 16' in FIG. 3) is provided (step 71), whereby the position data set formed the basis for the arrangement of the generated workpieces. Furthermore, in the area of the sorting table, the movement of a sorting support unit carried close to a hand of the operator is monitored with a localizing system. Thereby, a position of the sorting support unit is continuously detected with the localizing system (step 73). Furthermore, the position of the sorting support unit is compared with the positions of the position data set (step 75). The comparison can, for example, be carried out with respect to a center of gravity of, or a center of an area of, the cut sheet metal pieces. At least one workpiece associated with the position of the sorting support unit is thus identified (step 77). For example, the workpiece or the workpieces closest to the sorting support unit are identified. For further use in supporting the sorting operation, the control unit 8 then generates a sorting signal (step 79), which includes information about the workpiece associated with the position of the sorting support unit.

The sorting signal can be transmitted to the control unit 8 and/or the MES 5 and can trigger downstream processes. In this way, the sorting signal can fulfil various tasks and trigger actions. In this way, the MES can cause the information to be displayed to the operator (step 81). For example, the type, the position, and/or the shape of the workpiece and/or information on the associated processing order such as order number, placing location or next processing step can be displayed. It can also indicate whether and how to proceed with the at least one workpiece removed.

Furthermore, a light projection can be directed onto one or more identified workpieces (step 83) that, for example, identifies a preferred workpiece or maps respective information onto the workpiece(s).

Furthermore, a workpiece collecting point that is associated with the identified workpiece(s) can be identified (step

85). For example, a flashing signal can be initiated or respective information can be displayed on a display of the workpiece collecting point unit 13. Thereby, a placing signal can be output as a function of the sorting signal to support the assignment of the removed workpiece by an operator to a subsequent processing step. For example, a placing of the removed workpiece according to an order is suggested at a workpiece collecting point corresponding to the order. This suggestion can include, for example, a flashing of an associated crate, a special signal/special information on a display associated with the crate, and/or the blending in of a marking of the associated crate into a display of data glasses 34.

This step is followed by removal of at least one workpiece from the sorting table (step 87), wherein the associated movement of the sorting support unit can be detected by the localizing system (step 89A) and booked as a removal operation (step 91A). Alternatively, the operator can cause the removal to be booked by additional gesture movements (step 91A) that in turn are detected by the localizing system (step 89B), or by using external input means (e.g., a foot switch) (step 89C).

Furthermore, information for placing a removed workpiece can be provided to the MES (step 93), e.g., by motion detection (step 89A'), gesture detection (step 89B'), or by using external input means (step 89C'), so that after completion of the placing operation, the same can be booked as a completed placing operation (step 91B). The detection of the placing operation can additionally include a monitoring of the weight of a specific workpiece collecting point and/or a monitoring of a motion trajectory or a part of a motion trajectory of the removed workpiece or an object (hand) causing the movement (see, e.g., FIG. 4).

If the placing operation corresponds to a placing operation associated with the sorting signal, a sorting completion signal can be output (step 95), e.g., again by a flashing signal, special outputs on a display of, e.g., the workpiece collecting point unit 13, and/or a marking in the display of the data glasses 34. For example, a display on a workpiece collecting point can be updated with regard to the placing of the removed workpiece.

If the placing operation deviates from a placing operation associated with the sorting signal, an error signal can be output (step 97), for example again by a flashing signal at the workpiece collecting point unit 13, special outputs on a display at the workpiece collecting point unit 13, and/or a marking in the display of the data glasses 34. Information regarding the correct placing operation assigned to the sorting signal can also be displayed repeatedly at the same time.

In addition, the system can monitor, for example, whether at least one removed workpiece was placed by an operator at a reject collecting point during a placing operation (step 99). The removed workpiece can be noted by the MES 5 as a rejected part, e.g., optionally entered in a list of missing parts.

A supplementary production signal can be output to a production control system for detected rejected parts. Here, for example, the production parameters of the removed workpiece are compared with a subsequent processing plan. If the production parameters correspond to the following processing plan and if a new production of the removed workpiece is available, the following processing plan can be supplemented with a production step for the production of a replacement workpiece for the rejected part. The generation of a replacement workpiece can also be provided for in later subsequent processing plans.

As indicated by dashed paths in FIG. 5, the steps of the method can be repeated to ensure continuous real-time monitoring and support of the sorting operation. With reference to FIG. 1, in the steps described above, communication can be based on a data link between the localizing system, the workpiece collecting units (e.g., their display units and their signal devices), and the control unit 8 of the machine tool 3 and the MES 5. Data can generally be exchanged via data cable with standard data connections, e.g., CAN, Profibus, RS232, RS485, USB, LAN, etc. However, it can also be done via infrared or radio (WLAN, Wi-Fi, etc.). As exemplarily shown in FIG. 1, the workpiece collecting point units 13 with their own data supply system 14 are wirelessly connected to the MES 5 and the control unit 8 for data exchange.

The communication also allows an operator to be provided with information directly at the data glove, on local monitors, and/or at the workpiece collecting point units 13; e.g., information available to the MES 5. On the one hand, the information that can be made available includes workpiece-specific information (herein also referred to as workpiece information) that refers to the manufacturing process and the associated data of the workpieces that are placed at the workpiece collecting point unit 13. On the other hand, the information that can be made available includes the workpiece collecting point unit 13 itself, its load, position, etc. that can, for example, be communicated optically and/or acoustically via the signal device.

If, for example, a specific workpiece cannot be associated with the position of the operator's hand in the case of small workpieces produced due to a lack of spatial resolution, several workpieces can be associated. If a workpiece is to be resolved, i.e., information on a workpiece is to be provided, the required resolution can be supported by other acquisition types such as cameras or scales. Furthermore, one can show to the operator (e.g., reduced) information for the plurality of workpieces and one can optionally allow him to select from the plurality of workpieces by an input.

The disclosed flatbed machine tool 3, the sorting system, and/or the method can also be used for workpieces 9 and/or shaped parts a, b, c with more than four corners and/or more than four edges.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, as limits of value ranges.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for supporting an operator during a sorting operation of workpieces arranged on a sorting table, wherein the workpieces have been produced according to a processing plan using a flatbed machine tool, with the use of a localizing system, the method comprising:

providing, based on the processing plan, a position data set included in the processing plan that includes positions of the workpieces on the sorting table;
detecting a position of a hand of the operator with the localizing system;
comparing the position of the hand of the operator with the positions of the workpieces in the position data set;
identifying at least one workpiece in the vicinity of the hand of the operator,
associating the at least one identified workpiece with the hand of the operator;
outputting a sorting signal, wherein the sorting signal includes information about the at least one identified workpiece associated with the position of the hand of the operator; and
providing information to the operator for placing a removed workpiece.

2. The method of claim 1, wherein one or more workpieces closest to the hand of the operator is identified as the at least one workpiece.

3. The method of claim 1, wherein the workpiece closest in a direction of movement of the hand of the operator is identified as the at least one workpiece.

4. The method of claim 1, further comprising displaying information about the at least one identified workpiece associated with the position of the hand of the operator on a display unit.

5. The method of claim 1, wherein the sorting signal provides sorting information that includes workpiece specific information for the at least one identified workpiece.

6. The method of claim 5, further comprising projecting the sorting information onto the at least one identified workpiece.

7. The method of claim 5, wherein the sorting information about the at least one identified workpiece is: optically superimposed on the at least one workpiece as text and/or is displayed on a display unit.

8. The method of claim 1, further comprising detecting and booking a removal operation of the at least one identified workpiece by determining a movement trajectory of the hand of the operator by evaluating the position data of the hand of the operator and detecting a removal movement in a section of the movement trajectory; and/or by detecting a gesture movement using the movement trajectory of the hand of the operator.

9. The method of claim 8, further comprising outputting a placing signal for system-supported placing of the removed workpiece at a workpiece collecting point unit provided for the removed workpiece.

10. The method of claim 1, further comprising recognizing and booking a placing operation of the removed workpiece performed by an operator by determining a movement trajectory of the hand of the operator after the removal of the workpiece, by evaluating the position data of the hand of the operator and detecting a placing movement in a section of the movement trajectory, and/or detecting a gesture movement using the movement trajectory of the hand of the operator.

11. The method of claim 10, further comprising:
providing an association of gestures and processes;
determining a movement trajectory of the hand of the operator by evaluating the position data of the hand of the operator;
recognizing a gesture in a section of the movement trajectory; and
performing a process assigned to the gesture.

12. The method of claim 10, further comprising outputting a sorting completion signal when the placing operation corresponds to a placing operation associated with the removed workpiece.

13. The method of claim 12, further comprising updating a display with regard to the placement of the removed workpiece.

14. The method of claim 1, wherein the sorting signal includes sub-signals each associated with a different workpiece within a plurality of workpieces associated with the position of the hand of the operator.

15. The method of claim 10, further comprising outputting an error signal when the placing operation is different from a placing operation associated with the removed workpiece.

16. The method of claim 15, further comprising displaying information regarding the placing operation assigned to the removed part.

17. The method of claim 1, further comprising:
monitoring a placing operation of at least one removed workpiece in a reject collecting point; and
associating the at least one removed workpiece as a reject.

18. The method of claim 17, further comprising:
outputting a supplementary production signal to a production control system;
comparing production parameters of the removed workpiece with a subsequent processing plan; and
if the production parameters correspond with the subsequent processing plan and there is availability with respect to the removed workpiece, supplementing the subsequent processing plan with a generation step for generating a replacement workpiece for the rejected workpiece.

19. The method of claim 1, wherein the sorting signal is generated in less than 0.5 s after the localizing system detects the position of the hand of the operator.

20. The method of claim 1, wherein the workpieces arranged on the sorting table are formed from one or more of: sheet metal, glass, semiconductor substrate structures, printed circuit board structures, and plastic.

21. The method of claim 1, wherein the information of the sorting signal on the at least one identified workpiece includes one or more of a type, position, shape, a placement position of the workpiece, and information on a subsequent process.

22. The method of claim 1, wherein the operator carries a sorting support unit on or near his hand, and the position of the hand is determined by locating the position of the sorting support unit, and wherein the position of the hand is equated with the position of the sorting support unit.

23. The method of claim 22, wherein the sorting support unit includes a transmitter, wherein a position of the transmitter is detected by the localizing system.

24. The method of claim 1, wherein the position of the hand is determined by image-assisted localizing of the hand with the localizing system and wherein the localizing system evaluates image data of one or more cameras.

25. A flatbed machine tool, comprising:
a processing unit;
a processing plan that includes a processing image data set;
a control unit for controlling the processing unit to instruct the flatbed machine tool to generate workpieces arranged next to one another in accordance with the processing image data set of the processing plan;
a sorting table for supporting the arranged workpieces for sorting after the workpieces are generated; and a localizing system for determining the position of a hand of an operator, wherein the control unit performs a method, comprising:

providing a position data set that includes positions of the workpieces;

detecting a position of a hand of the operator with the localizing system;

comparing the position of the hand of the operator with the positions of the workpieces in the position data set;

identifying at least one workpiece in the vicinity of the hand of the operator;

associating the at least one identified workpiece with the hand of the operator;

outputting a sorting signal about the at least one identified workpiece associated with the hand of the operator; and providing information to the operator for placing a removed workpiece.

26. The flatbed machine tool of claim 25, further comprising:

at least one movable workpiece collecting point unit, wherein the localizing system is a system for detecting and monitoring movements of a sorting and placing operation for monitoring a movement trajectory or at least a part of a movement trajectory that is associated with a removed workpiece or with an object effecting the movement; and wherein the control unit is adapted to evaluate the position data set, to integrate location context sensitive information about the environment of the hand of the operator in the sorting process, and to control parameters of the placing process via gestures.

27. The flatbed machine tool of claim 25, further comprising a sorting support unit carried near the hand of the operator that is adapted to be locatable with the localizing system, wherein the sorting support unit has a passive transmitter, the position of which is detected by the localizing system.

28. The flatbed machine tool of claim 25, wherein the localizing system includes at least one antenna for receiving signals from the sorting support unit.

29. The flatbed machine tool of claim 25, wherein the localizing system includes one or more cameras for acquiring images of the position of the hand of the operator.

30. The flatbed machine tool of claim 25, wherein the localizing system includes an evaluation unit for determining the position of the hand of the operator for evaluating gestures associated with movement trajectories.

31. The flatbed machine tool of claim 25, wherein the sorting table is part of a pallet exchanger of the flatbed machine tool.

32. The flatbed machine tool of claim 25, further comprising a projection unit for projecting workpiece-specific information onto the at least one workpiece associated with the position of the hand of the operator.

33. The flatbed machine tool of claim 32, wherein the projected workpiece-specific information includes: customer data, information about a subsequent process step, a number of further identical parts, an assigned workpiece collecting point, or an order number for the at least one workpiece associated with the position of the hand of the operator.

* * * * *